Fig. 1.

Inventor
ANDREAN G. RONNING
ADOLPH RONNING

July 1, 1930.  A. G. RONNING ET AL  1,769,038
COMBINATION TRACTOR CULTIVATOR
Original Filed April 29, 1920   6 Sheets-Sheet 5

Inventor
ANDREAN G. RONNING
ADOLPH RONNING

Attorney

Patented July 1, 1930

1,769,038

UNITED STATES PATENT OFFICE

ANDREAN G. RONNING AND ADOLPH RONNING, OF MINNEAPOLIS, MINNESOTA, ASSIGNORS TO INTERNATIONAL HARVESTER COMPANY

COMBINATION TRACTOR CULTIVATOR

Original application filed April 29, 1920, Serial No. 377,564. Divided and this application filed August 14, 1926. Serial No. 129,138.

Our invention relates primarily to tractor-cultivators and the main object is to provide an improved tractor and an improved type of cultivator, in which each unit embodies a number of novel features over the prior art, and in which the cultivator unit is associated and adjustably connected with the tractor unit in such a manner as to provide a complete machine of a highly novel, efficient and practical nature. Further and more specific objects will be disclosed in the course of the following specification, reference being had to the accompanying drawings, wherein:

Attention is now directed to the tractor unit, the frame of which is preferably a cast shell made up of rigidly but detachably connected upper and lower shell or frame sections 1 and 2 that enclose the transmission and certain other parts. The lower frame section 2, at its front end, supports a radiator 3 and an internal combustion engine 4. The lower frame section 2, at its opposite sides, has depending pocket like portions 5 to which are rigidly but detachably secured, axially aligned outstanding combined gear housing and journal supports 6. The supports 6, at their outer ends, are formed with vertically spaced ears, to which wheel journal sleeves 7 are connected by vertically aligned pivots 8 (see Figs. 1 and 3). The sleeves 7 are thus mounted for horizontal oscillatory movements, and are provided with inwardly projecting arms 9.

Figure 3:
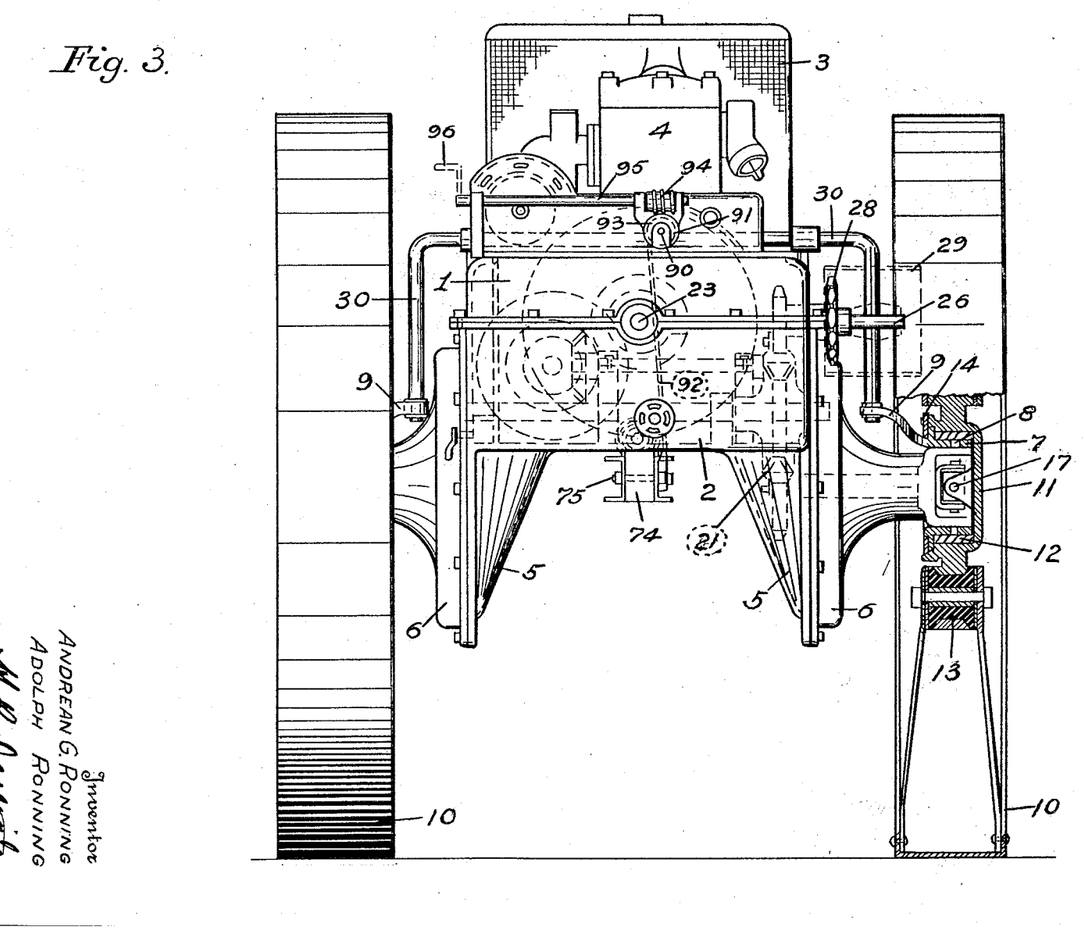
Fig. 3 is a rear elevation of the tractor unit, some parts being sectioned.

The tractor has two laterally spaced traction wheels 10, formed with wheel hubs 11, journaled on roller bearings 12 arranged to run on the respective wheel journal sleeves 7. In the construction illustrated, the wheel spokes are connected to the hub 11 by couplings including rubber bushings 13 that act as cushions. As shown in Fig. 3, the wheel hubs 11 are held against lateral displacement by retaining rings 14 secured to said hub and lapping flanges of said sleeves 7. The traction wheels are thus mounted for horizontal oscillatory or steering movements.

To transmit the power from the engine to the traction wheels, axially aligned transversely spaced stub shafts 15 are journaled in the sleeve portions of the combined gear housings and journal supports, preferably by means of interposed roller bearings 16. The outer ends of these shafts 15 are connected to the respective wheel hubs 11 by universal knuckle joints 17 designed to transmit the driving torque. Spur gears 18 located within the journal supports 6 are rigidly secured to the inner ends of the respective stub shafts 15. These two gears 18 mesh with pinions 19 secured to the outer ends of a divided shaft 20, the sections of which are driven, preferably, through an ordinary equalizing or differential gear mechanism 21.

For the purposes of this case it is sufficient to state that the differential gear mechanism 21 may be driven from the engine through reversible, variable speed mechanism of any suitable or well known construction. For a reason that will presently appear, however, the cam shaft 22 of the engine should be noted; and for another reason, the main transmission shaft 23, which is mounted in suitable bearings on the main frame, and is adapted to be connected to the engine fly wheel 24 by the customary clutch 25, should also be noted (see Figs. 1 and 4).

Figure 1:
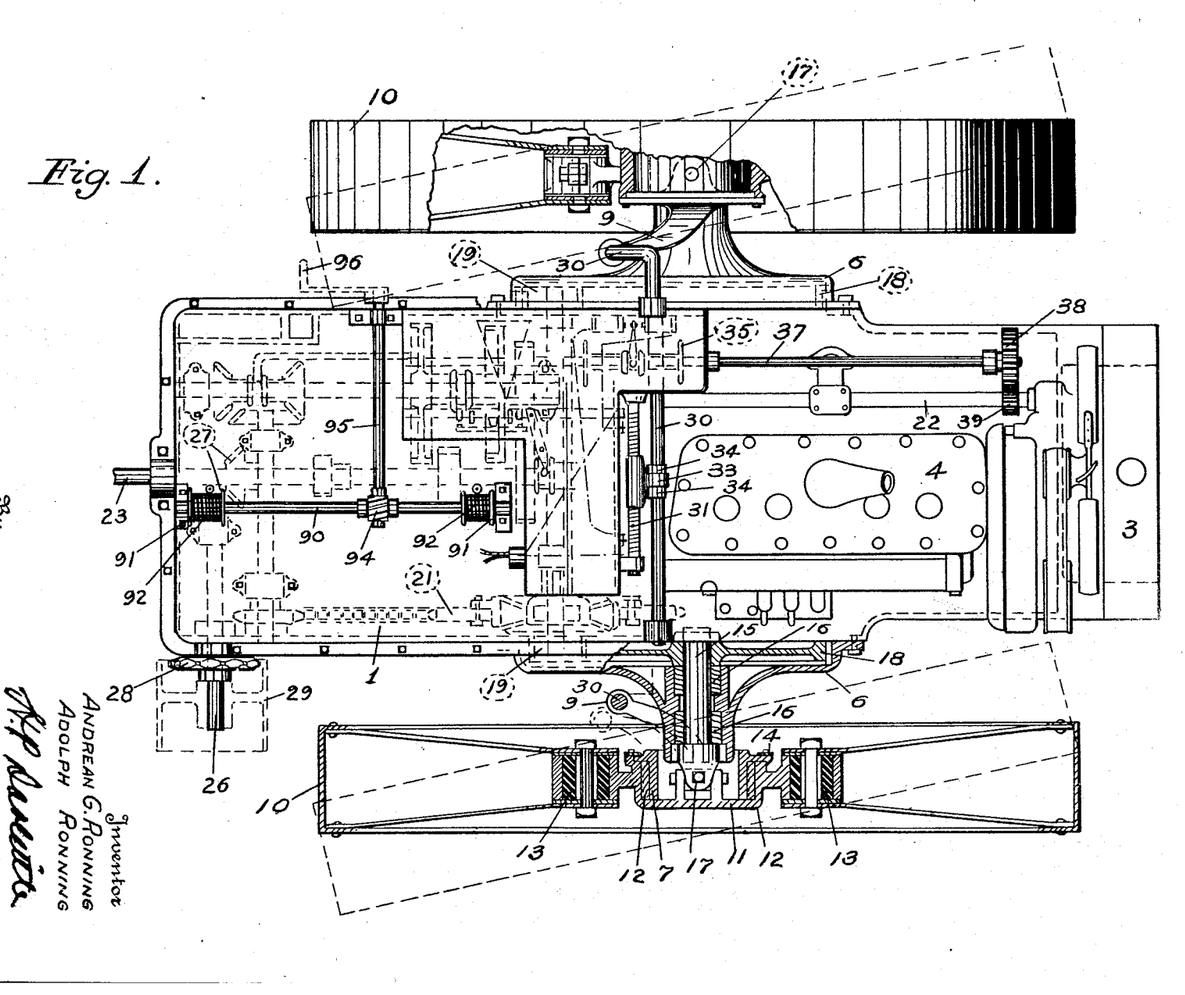
Fig. 1 is a plan view, with some parts broken away and some parts in horizontal section, of our improved tractor unit.

For transmitting power from the tractor, a pulley, gear, or the like, not shown, might be applied to the extended end of transmission shaft 23, but preferably, and in Fig. 1, we have shown a transverse auxiliary power shaft 26 journaled to the frame of the tractor and driven from shaft 23 through beveled gears 27. Shaft 26, at its outer end, may be equipped with a sprocket 28, or pulley 29.

Figure 2:
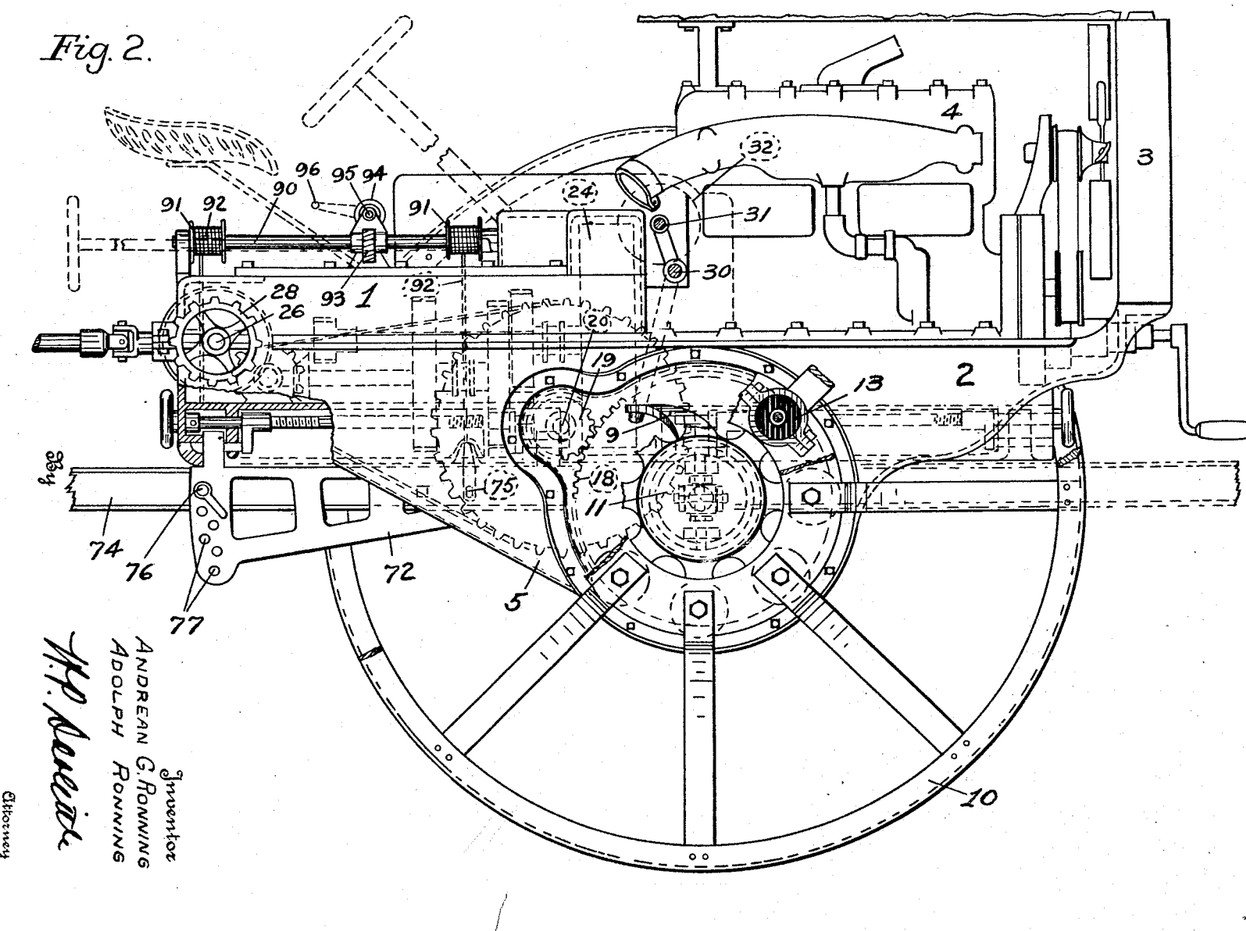
Fig. 2 is a side elevation of the tractor shown in Fig. 1, some parts being broken away and some parts being in section.
Figure 4:
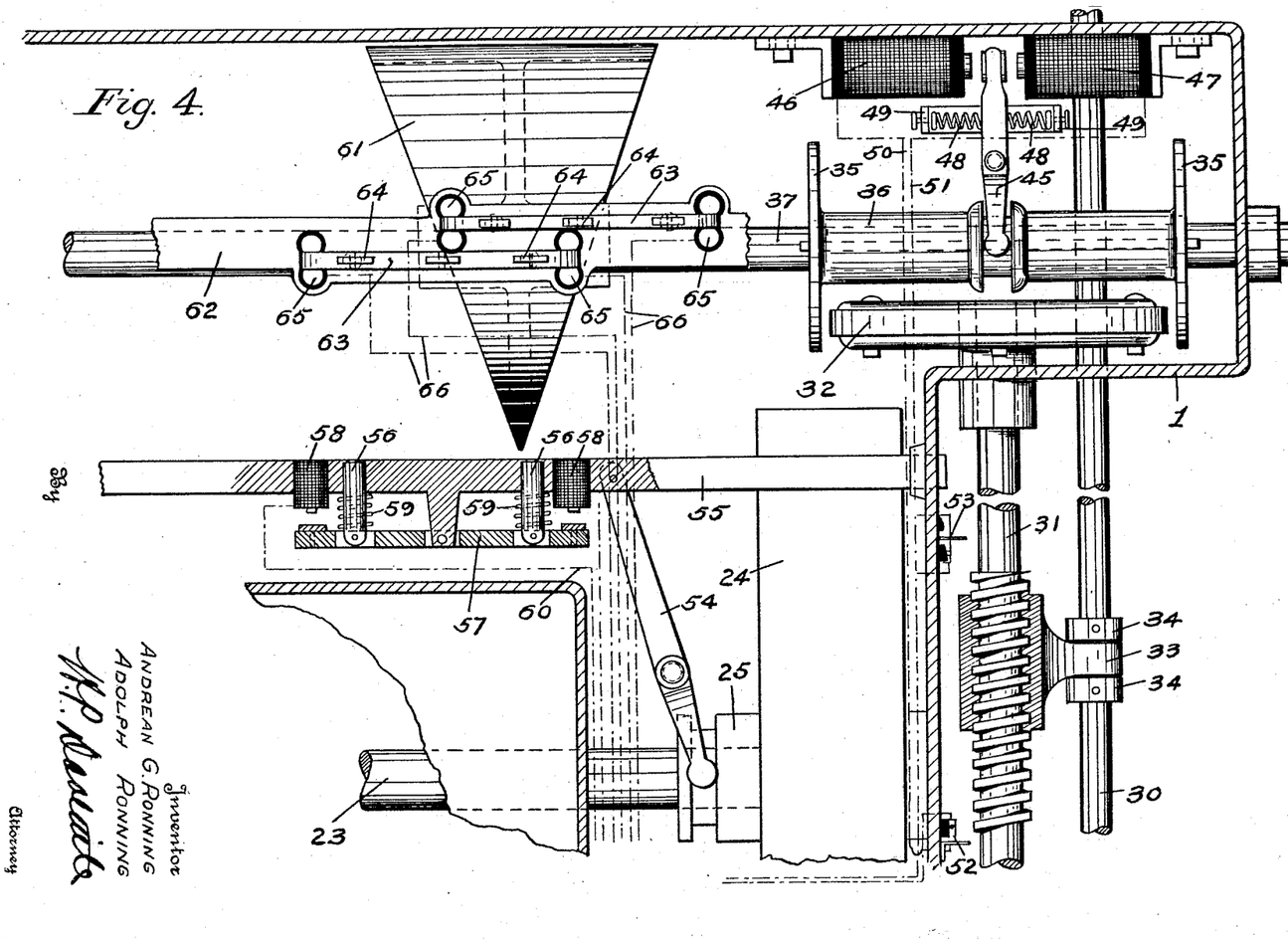
Fig. 4 is an enlarged fragmentary view, partly in horizontal section and partly in plan, showing parts of the steering and control mechanism of the tractor.

For connecting the wheel journal sleeve 7, and hence, the traction wheels for parallel oscillatory steering movements, there is provided a transversely slidable steering rod 30 mounted in suitable bearings on the main frame, and provided with downturned prongs, the ends of which are pivoted to the ends of the arms 9 (see particularly Figs. 1 and 2). The endwise movements of the rod 30 necessary to steer the tractor may be produced in different ways, but, as a novel feature, we provide a steering controlled mechanism which, in itself, involves novel features and which is best illustrated in Figs. 1 and 4. Describing the same, the numeral 31 indicates a shaft journaled in suitable bearings on the upper frame section 1 and provided at one end with a peripheral friction wheel 32. At its intermediate portion, shaft 31 has threaded engagement with a shipper head 33, the arm of which embraces steering rod 30 and is held between collars 34 thereon.

The peripheral friction wheel 32 is adapted to be engaged, at will, with either of two opposing face friction wheels 35 carried by a sleeve 36 keyed to slide on but to rotate with a longitudinal shaft 37 journaled in suitable bearings on the frame section 1. This shaft 37, at one end, has a spur gear 38 that meshes with a spur pinion 39 on the engine cam shaft 32, so that said shaft 37 will be driven in a constant direction. Obviously, the direction of rotation of shaft 31 will depend on which of the two face friction wheels 35 is engaged with the peripheral friction wheel 32, and hence, by shifting of these face friction wheels, turning of the traction wheels in the one direction, or the other, to steer the tractor, may be controlled, at will, by sliding movements of the sleeve 36. The steering of the tractor, as stated, requires that the two-wheeled tractor described be coupled to some other vehicle to afford a base of reaction for the steering movement, or the tractor must be provided with a balancing wheel, or the like, to afford such base of reaction.

For shifting the sleeve 36 endwise to effect the steering of the tractor by power afforded from the tractor engine, as described, we provide electro-magnetic actuating means and co-operating mechanical devices shown in Fig. 4. The numeral 45 indicates an intermediately pivoted shipper lever, one end of which works between collars on the sleeves 36, and the other end of which is in the form of an armature that works between two opposing electro-magnets, 46 and 47 suitably anchored to the main frame 1, preferably, by adjustable connections that permit setting of the magnets for proper pressure between the friction wheels 32 and 35. Opposing springs 48 react against a fixed bracket 49 and normally hold the tripper lever 45 in a centered position with both friction wheels 35 disengaged from friction wheel 32.

The coils of magnets 46 and 47, at one end, may be assumed to be grounded through the machine frame, but current will be supplied thereto, respectively, through lead wires 50 and 51 that extend from a suitable battery or source of electrical energy not shown. In the lead wires 50 and 51, respectively, are normally closed switches 52 and 53 that are adapted to be open and thereby cause de-energization of the said magnets and return of the friction wheels 35 to inoperative positions, if, at any time, the shipper head 33 is permitted to run to an extreme position in either direction. These switches, therefore, act as safety devices to prevent breaking of the running parts of the steering mechanism, or movements of the traction wheels beyond predetermined angular adjustments.

The clutch 25 which connects the shaft 23 to the fly wheel 24 may be of standard construction, but should preferably be of a type that will stay in either position in which it is set, towit: either in an open or closed position until acted upon by the shifting device. For shifting the clutch 25, there is provided an intermediately pivoted shipper lever 54, the outer end of which is connected to a slide 55 mounted in suitable bearings on the framework and provided with two normally retracted cam pins 56 connected by an armature bar 57 intermediately pivoted to a projection of slide 55 and subject, at its outer ends, to electromagnets 58 carried by said slide. Coiled springs 59 yieldingly hold the armature bar 57 in its intermediate position and both cam pins retracted. When slide 55 is moved toward the right, clutch 25 will be released, and when slide 55 is moved toward the left, the clutch will be set and cause shaft 23 to move with the engine fly wheel 24.

These movements of slide 55 will be accomplished, as follows:

The coils of electro-magnets 58, at one terminal, are grounded through the metal parts of the machine, but at their other terminals are connected to lead wires 60 that lead from a battery or other source of electrical energy. Circuits through wires 60 may be controlled by any suitable means such as independent push buttons or switches, not shown. The numeral 61 indicates a shipper cam secured to shaft 37. This cam has a cylindrical outer surface that is concentric to the axis of the shaft 37, but in plan view, with the cam in the position shown in Fig. 1, said cam is wedge shape, that is, diverges obliquely in opposite directions. This cam 61, of course, rotates constantly with the shaft 37, but normally it cannot act upon either of the cam pins 56. When the clutch is set and it is desired to move the same to an open position, circuit through right hand lead 60 and right hand electro-magnet 58, will be closed, and said magnet, then acting upon right hand end of armature bar 57 will project right hand cam pin into the path of movement of the oblique right hand side of cam 61, so that under the first half rotation of said cam, slide 55 will be moved to an extreme position toward the right, thereby releasing the clutch.

When the clutch is released, left hand cam pin 56 will stand close to the apex of the cam 61, so that, when left hand magnet 58 is then energized, the operation above described is the reverse, that is, cam pin 56 will be projected into the path of movement of the oblique left hand side of the cam 61, and, under the first half of rotation of the said cam, slide 55 will be moved back to its position shown in Fig. 4 and clutch 55 will be again set.

The scheme just described for throwing the clutch into and out of action may be utilized for other purposes, such, for example, as for shifting the change speed gears or reverse gears, for setting or releasing the brakes, or generally, for moving shiftable devices. Where several different shifting devices of this character are used, they would be located circumferentially spaced within or around the path of movement of the cam 61. In Fig. 4 two other such devices are shown, the same being applied to a slide 62 shown as located above the cam 61 and provided with two intermediately pivoted armature bars 63 located, one ahead of the other. These armature bars and associated parts are duplicates of each other and of the armature bar and associated parts hitherto described. They are provided with cam pins 64 and are subject to electro-magnets 65 grounded through the machine, and each receiving current through an independent lead 66. With the armature bars and cam pins staggered or spaced, one ahead of the other on the slide 62, said slide may be given step by step movements in either direction, at will, and hence, is especially adapted for shifting sliding two-speed transmission gears.

The implements, such as the cultivators in the present instance, which are to be pushed or pulled by the tractor are connected by a coupling device including a pole or tongue 74, another combination of the tractor and implements being described in our co-pending application, Serial No. 377,564, filed April 29th, 1920, for combination tractor implement, patented Jan. 29, 1929, No. 1,700,421, of which the present application is a division. The front end of the pole 74 is pivotally connected by nut-equipped bolt 75, to the front end of a coupling head 72, and said pole is adapted to be held at different angles by a nut-equipped bolt 76 which may be passed through any of the perforations 77 in the outer ends of the flanges of the coupling head 72. With this arrangement, it is obvious that the pole 74 may be disconnected from the tractor, either by disconnecting the same from the coupling head 72, or by disconnecting the coupling head 72 from the tractor by withdrawal of the coupling pin 68 as more fully set forth in our co-pending application above referred to.

The coupling head 72 and the pole 74 are quite heavy structures and, moreover, with some types of implements are subject to considerable downward pressure from the vehicle of which they form a part, and hence it is desirable to provide a lifting device for bringing the same up into position, for being attached to the tractor. For this purpose there is mounted a windlass shaft 90 in suitable bearings on the top of the rear portion of the tractor frame, and this shaft is provided with windlass drums 91 having cables 92, the lower ends of which are detachably anchored to the coupling heads 72. On the intermediate portion of the windless shaft 90 is a worm gear 93 that meshes with a worm 94 on a transverse shaft 95, also journaled in suitable bearings on the top of the frame of the tractor. For rotating the shaft 95, it may be provided, at its outer end, with a crank 96, indicated by dotted lines in Figs. 1 and 2.

Attention may here be called to the fact that the tractor above described is not primarily intended for use as a tractor independent of any other vehicle or implement, but, rather, is a tractor designed and especially adapted for use and association in combination with other implements or vehicles.

Figure 7:
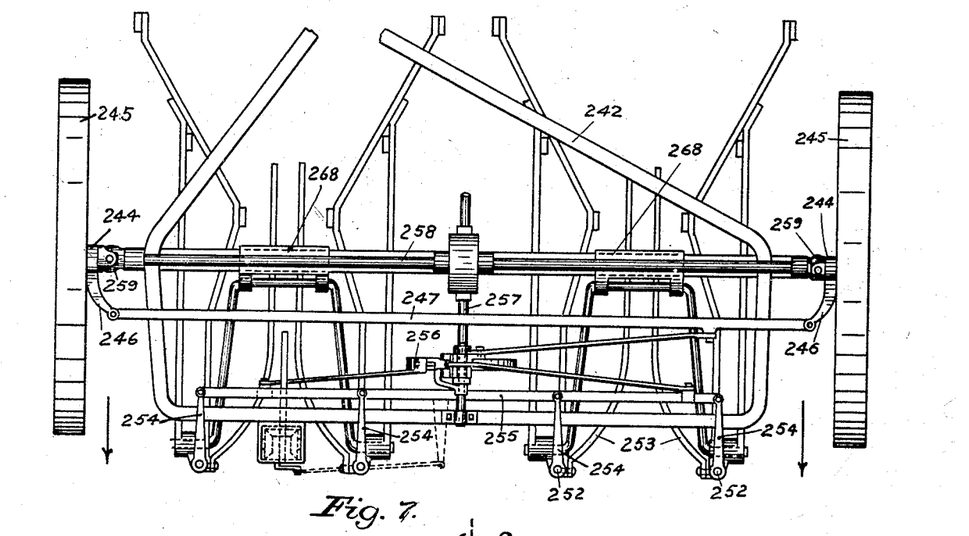
Fig. 7 is a plan view showing a somewhat modified form of the cultivator illustrated at the front of the tractor in Fig. 5.
Figures 8, 9:
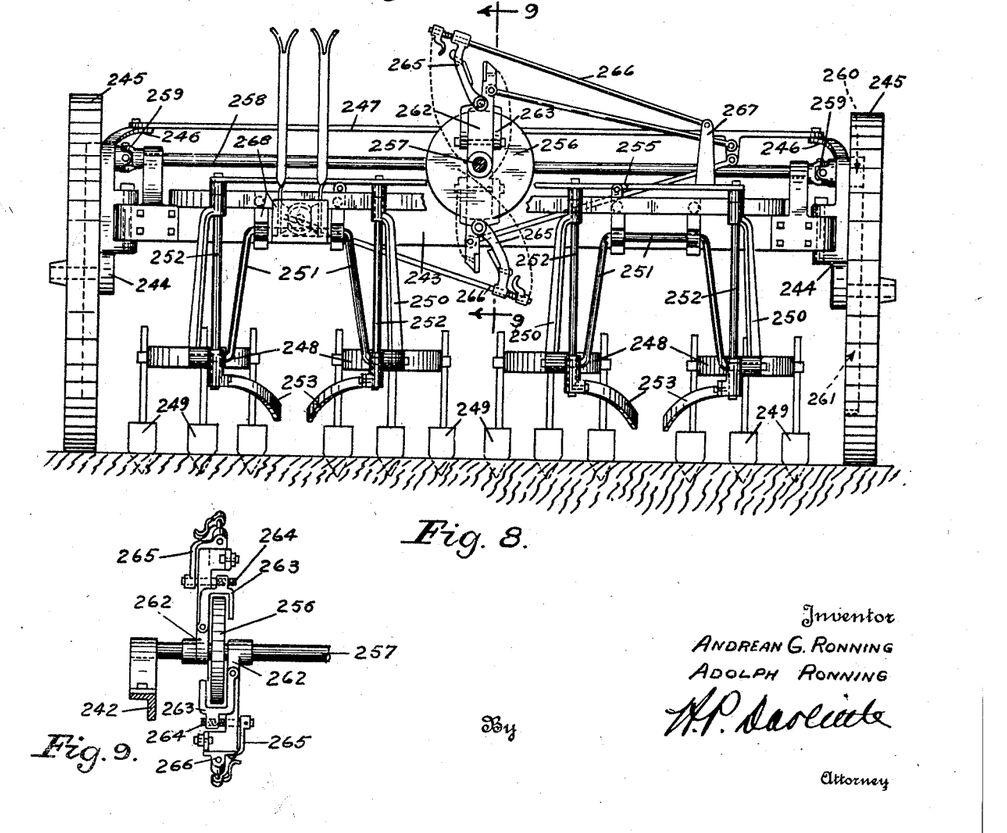
Fig. 8 is a front elevation of the cultivator shown in Fig. 7.
Fig. 9 is a detail in section taken approximately on the line 9—9 in Fig. 8.

An automatic steering mechanism is illustrated in Figs. 5 to 9, inclusive, but attention is first called, particularly to Figs. 7, 8, and 9, which illustrate a cultivator having an automatic mechanical steering mechanism operated by contact with the standing stalks. Referring thereto, the numeral 242 (for convenience in comparison and identification the same parts will be referred to by the same characters as in the parent case Ser. No. 377,564) indicates the framework of the cultivator, the same being rigidly secured to an axle beam 243, to the ends of which, stub axles 244 are pivoted for steering movements of wheels 245 journaled thereon. The stub axles 244 have arms 246 connected by a steering rod 247 which connect the wheels 245 for parallel steering movement. The numeral 248 indicates a plurality of cultivator beams to which cultivating tools 249 are attached. The beams 248, at their front ends are pivotally connected for vertical movements to the lower ends of pedestal brackets 250. The numeral 251 indicates U-shaped push bars or beams pivotally connected to bearings on the axle beam 243 and having laterally bent front ends that are pivoted also to the lower ends of the brackets 250.

The numeral 252 indicates upright shafts journaled in the brackets 250 and having curved feeler arms 253 secured to the lower ends. The feeler arms 253 are arranged to work in pairs, one on each side of each row of corn, and the same statement is true in respect to the groups of cultivating tools 249. Arms 254 are secured to the upper ends of the shafts 252 and are connected by a tie bar 255. The cultivator beams 248 may be raised and lowered by the customary means, not shown.

The numeral 256 indicates a rotary clutch disk or wheel shown as secured to a shaft 257 which may be driven in any suitable way, but which, for illustration, may be assumed to be gear connected to a transverse shaft 258 mounted in suitable bearing on the axle beam 243 and connected by knuckle joints 259 to pinions 260 that are journaled on the stub axles 244 and mesh with internal gears 261 carried by the wheels 245.

For co-operation with the clutch disk 256, we provide reversely acting clutches shown as, one extended upwardly, and the other downwardly, from shaft 257. Each such clutch comprises a main arm 262 working close to one face of the disk 256 and rotatively and slidably mounted on shaft 257. Pivoted to the arm 262 is a supplemental arm 263, the free end of which is turned downward, so that it is engageable with the opposite side of the disk. The free end of supplemental arm 263 is connected to co-operating arm 262 by a right and left screw 264, which, when turned in one direction, releases the disk 256, but which, when turned in the opposite direction, causes the two arms 262 and 263 to tightly grip said clutch disk. To one end of the screw 264 is attached an arm 265. The upper and lower arms 265, respectively, of the upper and lower clutch devices, are connected by rods 266 to lugs 267 on the tie bar 255.

It has already been stated that the rear upper portions of the push bars or beams 251 are pivotally connected to the axle beam 243, but preferably, this is indirectly accomplished by pivoting said push bars to carriers or cross heads 268 that are slidably mounted on said axle bar, so that the cultivator units may move slightly transversely of the machine and transversely of the rows of corn that are being cultivated.

The automatic steering action is produced by the contact of the feeler arms 253 with the corn stalks but only light pressure will produce the steering action, because the real work of moving the cultivators is performed by power taken from the wheels or other parts of the cultivator, or from the tractor used to push or pull the cultivator. More definitely stated, lateral pressure on one or the other of the feeler arms 253 will move tie bar 255 in the one direction, or the other, and will cause either the upper or the lower clutch device to grip the power driven clutch disk 256; and when one of these clutch devices is gripped to said disk, it will move the steering rod 247 in the proper direction to oscillate the wheels 245, and thus automatically cause the cultivator to follow the rows of corn that are being cultivated. Obviously, the upper and lower clutch devices operate to move the steering rod 247 in opposite directions. When the wheels 245 have corrected the tendency of the machine to drift laterally in one direction, the clutch device just operated will be released, and if the machine continues to drift too far in the same direction, the other feeler arm 253 will be brought into action and the other clutch device will be thrown into action, thereby bringing the machine back to its proper line of travel. Thus, the cultivator is caused to properly follow the rows of standing corn.

Figures 5, 6:
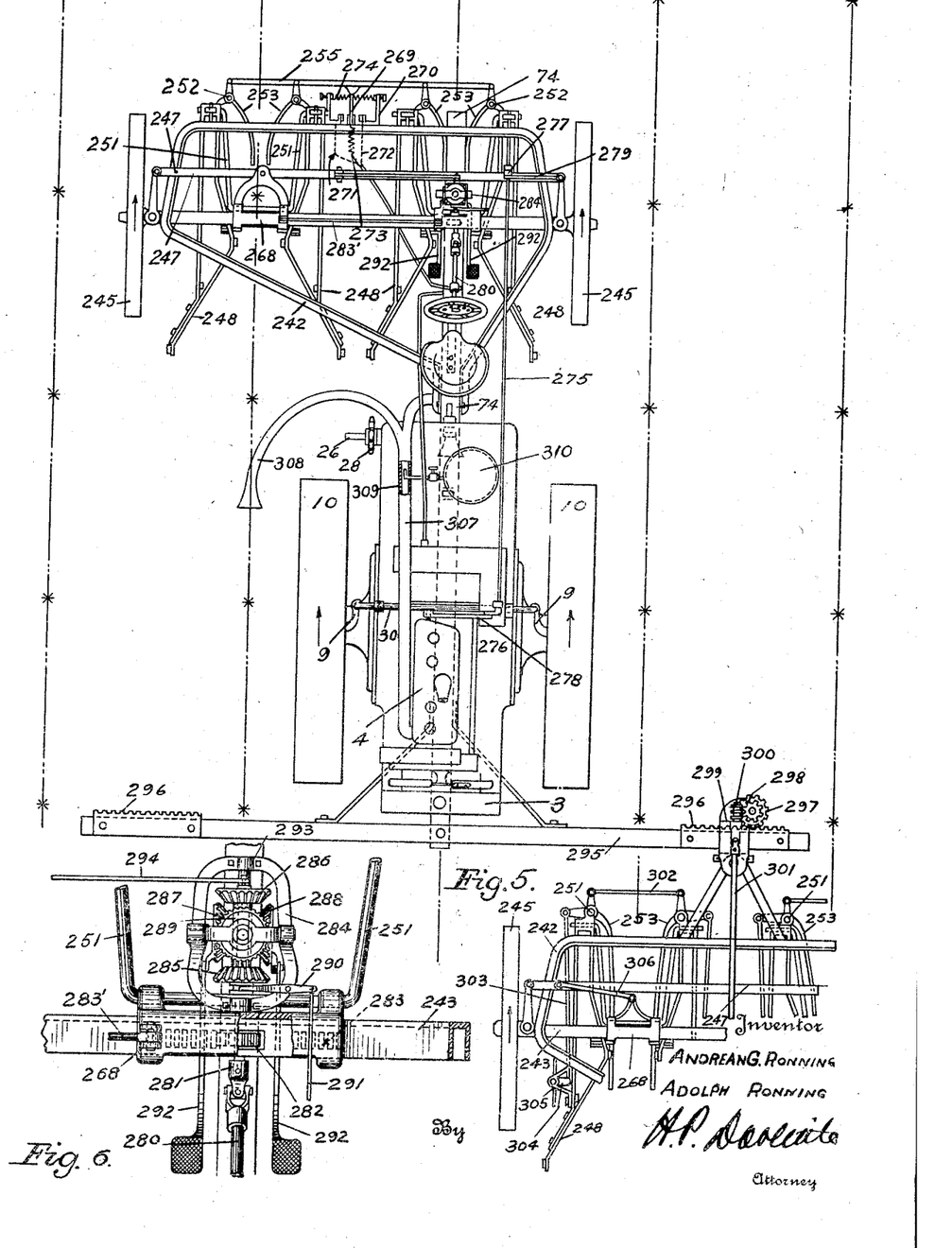
Fig. 5 is a plan view of the tractor together with the cultivator rig attached in advance, and also showing the method of drawing additional cultivators in the rear. This view also illustrates the automatic steering mechanism employed in the machine.
Fig. 6 is an enlarged detail plan view, partly in section, showing the gear mechanism and certain associated parts of the manually actuated steering control of the cultivator shown in Fig. 5.

Attention is now directed to Figs. 5 and 6, wherein there is illustrated an arrangement for pushing ahead one wheel-equipped cultivator, and for dragging behind two similar cultivators from the tractor described. The cultivators here illustrated are substantially the same as the cultivator illustrated in Figs. 7 and 8, but certain modifications are involved. The lead or pushed cultivator will first be described, in so far as it is modified over the cultivator previously described.

The frame 242 of this cultivator is attached or secured to the forward portion of the push pole or longitudinal frame member 74 of the tractor. Preferably, this cultivator is of the two-row type and so positioned with respect to the tractor body as to extend laterally beyond one side thereof with one pair of cultivators gangs positioned to work a plant row straddled by the traction wheels of the tractor and the other pair the next adjacent row at the outer side of one of the traction wheels, as clearly shown by Fig. 5. In this arrangement, the automatic steering mechanism is intended to operate the steering mechanism of the tractor shown in Fig. 4 by alternately energizing the electro-magnets 46 and 47. To accomplish this the coupling bar 255 is provided with an intermediate contact arm 269 that works between insulated contacts 270 on the frame 242. A wire 271 will lead from the left hand contact 270 to one terminal of the magnet 46 while a wire 272 will connect the right hand contact 270 to the magnet 47. A wire 273 will connect the intermediate contact 269 to the terminals of both magnets 46 and 47. The source of electrical energy in the circuit noted may be a battery, magneto, or any other suitable means. The contact 269 is yieldingly held in an intermediate position by opposing coiled springs 274. By the above means, the wheels of the tractor are automatically given steering movement, but it is also necessary that the wheels of the cultivator be given similar but reverse steering movements, and to accomplish this there is shown a rod shaft 275 mounted on the tractor frame and on the cultivator frame and provided at its rear end with a depending arm 276, and at its forward end, with an upstanding arm 277. The depending arm 276 is connected to the steering rod 30 of the tractor by a connecting rod 278, and the upstanding arm 277 is connected to the steering rod 247 of the cultivator by a connecting rod 279.

For cutting the electrical contacts 269 and 270 out of action, a switch may be placed in the common return lead 273.

For manually controlling the steering movements of the cultivator wheels 245 and for shifting the cultivator units, including the beams 248, we provide mechanism best shown in Fig. 6, but also at the forward portion of Fig. 5. This shifting means includes a steering shaft 280 connected by a knuckle joint to shaft 281 journaled in bearings on axle beam 243. The shaft 281 has a spur gear 282 that engages rack teeth 283 on one of the sliding cross heads 268. The two cross heads 268 are connected for common sliding movements by a tie rod 283'. The numeral 284 indicates a gear frame that is rigidly secured on, or in respect to the axle beam 243. Beveled gears 285, 286, 287, 288, and 289 are journaled to the frame 284. The three gears 287, 288 and 289 are constantly in mesh. The gears 285 and 286 are connected to a common sleeve that is slidably mounted on shaft 281, so that either of said gears may, at will, be thrown into mesh with the gears 287, 288, and 289. Gear 285 has a grooved hub engaged by a shipper lever 290 adapted to be operated by a rod 291. Foot treadles 292 are secured, one to each of the gears 287—288. Gear 289 has an eccentric pin 293 which, by a connecting rod 294, is connected to the steering rod 247.

For connecting cultivators at the rear of the tractor in offset relation thereto, a long transverse hitch beam 295 is rigidly attached to the tractor frame, and as shown, at its ends, has racks 296 engaged by pinions 297 connected to small worm gears 298, both journaled to cross heads 299 mounted to slide on the racks 296. The numeral 300 indicates a worm mounted on the cross head 299 and adapted to be rotated by a steering post shaft 301.

Only one of the two rear cultivators which may be connected to bar 293 is shown, and this is of substantially the same construction as the front cultivator, except that certain parts are left off and the feeler arms 253 are connected by tie links 302, and one of said arms has a projecting end connected by a rod 303 to the projecting crank arm 304 of a ground engaging disk 305 connected by a vertical pivot to one of the cultivator bars 248. Cross head 268 is connected by a link 306 to a steering rod 247.

When, by pressure on one or the other of the feeler arms 253, the disk 305 is obliquely set in respect to the line of travel, the resulting side thrust of the soil on the disk will crowd over the cultivator beams 248 and corresponding cross head 268, and through link 306 and steering rod 247, the cultivator wheels 245 will be oscillated in the proper direction to correct the travel of the cultivator. It is, of course, intended that the cultivators connected to the rear of the tractor shall operate on plant rows next beyond those cultivated by the front cultivator, thus making it possible to cultivate two, four, or six rows at once, assuming that two-row cultivator units are employed.

The tractor shown in Fig. 5 has an exhaust pipe 307 provided with a branch 308 that is out-turned and terminated in a nozzle positioned to blow a blast directly above a row of vegetation growing along the line of travel. Into this exhaust pipe is projected a nozzle 309 that leads from a tank 310 that may contain a liquid solution of Paris green, or other germicide or insecticide, so that this liquid, taken up by the exhaust, will be blown onto the plants. Seeds might be deposited in furrows, by substantially the same means, or dry powder may be blown onto the plants in the same general plan. The automatic steering devices illustrated in connection with the cultivator and the cultivator and tractor rig in somewhat modified form might be used to follow a furrow and thus to cause the tractor, in pulling a gang plow, to properly follow the last furrow made on the previous trip.

It is understood that suitable modifications may be made in the general design and structural details of the invention as herein shown and described, provided, however, that said modifications come within the spirit and scope of the appended claims. Having now therefore fully shown and described my invention, what we claim to be new and desire to protect by Letters Patent is:

1. In a row crop cultivator, the combination of a suitable frame having a pair of dirigible supporting wheels, gangs of cultivating tools carried by the frame and shiftable laterally with respect thereto, and means including actuating elements movable upon engagement by a plant row, for shifting the cultivator tools and steering said dirigible wheels simultaneously with the shifting of the cultivator tools.

2. In a cultivator, the combination of a wheel supported frame having steering means, laterally adjustable tool carriers carried by the frame, cultivator tools carried by the carriers, feelers carried by the frame and adapted to travel on opposite sides of a row of plants under cultivation by said tools and be engaged by plants out of line, and a clutch operated mechanism, actuated by said feelers, for adjusting said tool carriers and actuating said dirigible means.

3. In a cultivator for cultivating rows of plants the combination including a wheel supported frame, laterally shiftable cultivating tools carried by the frame in straddle-row relation, power actuated means for shifting the tools, and means controlled through engagement with deviated sections of a plant row, for engaging and disengaging said power actuated means comprising twin contact elements between which the plant row passes.

4. In a cultivator for cultivating rows of plants the combination including a wheel supported frame, laterally shiftable cultivating tools carried by the frame, power actuated means for shifting the tools and simultaneously steering the machine, and means controlled through engagement with deviated sections of a plant row, and associated with the power actuated means, for rendering the latter active and inactive.

5. The combination with a tractor, of a cultivator unit connected to its front end, a crossbar transversely arranged on the rear end of the tractor, and a pair of offset cultivator units disposed behind the tractor with one unit at each outer side of the front unit and connected to the ends of the crossbar.

6. A tractor cultivator comprising a pair of traction wheels and steering wheels, cooperating cultivator gangs mounted on the tractor in advance of the traction wheels and positioned to work the soil within the space spanned by the traction wheels, a laterally projecting frame member mounted on the tractor rearward of said gangs, and a cultivator unit connected to said projecting frame member and positioned to work at the side of the tractor.

7. A tractor cultivator comprising a pair of traction wheels and steering wheels, cultivator gangs carried on the forward portion of the tractor and positioned to work the soil in the path spanned by the traction wheels, a transverse frame bar secured to the tractor to the rear of said forward gangs and projecting beyond the traction wheels, and wheel supported cultivator units connected to the ends of said transverse bar and positioned to work in paths at each side of the tractor.

8. A tractor cultivator comprising traction means and steering means, a transversely extending frame on the tractor forward of the traction means extending laterally beyond one side of said means, cooperating cultivator gangs carried on the extended end of said frame, a transversely extending frame member on the tractor at the rear of said frame having a portion projecting laterally beyond the traction means at the opposite side thereof, and a cultivator unit connected to the end of said frame member and positioned to work at the side of the tractor.

9. A tractor cultivator comprising traction means and steering means, a transversely extending frame on the tractor forward of the traction means extending laterally beyond one side of said means, cooperating cultivator gangs carried on the extended end of said frame, a transversely extending frame member on the tractor behind said traction means having a portion projecting laterally beyond said means at the opposite side thereof, and a cultivator unit connected to the end of said frame member and positioned to work at one side of the tractor.

10. In a tractor cultivator, the combination of a tractor, a pair of dirigible wheels at each end of the tractor, gangs of cultivating tools carried by the tractor, means for simultaneously steering each pair of wheels in opposite directions, and means adapted to be actuated through contact with a plant row for putting said steering means in operation to effect steering of the wheels in a direction to break said contact.

11. A cultivator comprising a motor propelled support, laterally shiftable cultivator beams suspended from the support in straddle-row relation, motor driven means for shifting the beams in either of opposite directions, and means for effecting actuation of the shifting means comprising plant contact elements on each beam and power actuated clutch mechanism under control of either of said contact elements.

12. A motor propelled cultivator comprising a frame, a motor thereon, traction wheels supporting one end of the frame and driven by the motor, a dirigible support on the other end of the frame, a laterally shiftable pair of cultivator beams hung from the frame in straddle-row relation, a plant contact element on each beam, power driven means for simultaneously shifting the beams and angling the dirigible support, and means for governing actuation of the shifting and angling means through engagement of said contact elements with a plant row.

13. A motor propelled cultivator comprising a frame, a motor thereon, dirigible traction wheels supporting one end of the frame and driven by the motor, dirigible carrying wheels supporting the other end of the frame, laterally shiftable cultivator beams suspended from the frame in straddle-row relation, a plant contact element on each beam, motor actuated means for shifting the cultivator beams and simultaneously angling the traction wheels and carrying wheels respectively in opposite directions, and means for governing actuation of the shifting an angling means through engagement of said contact elements with a plant row.

14. A tractor cultivator for row grown crops, comprising a longitudinally extended frame having a lateral extension at its forward end, a pair of spaced traction wheels supporting the rear of the frame, a pair of dirigible carrying wheels on the ends of the extended forward portion of the frame, one of said carrying wheels being disposed in tracking relation to one traction wheel and the other carrying wheel being in outwardly offset relation to the other traction wheel, a frame member projecting laterally at the rear of the tractor on the side opposite to forward lateral extension of the frame, and a straddle-row cultivator unit connected to the end of said frame member.

In testimony whereof we affix our signatures.

ANDREAN G. RONNING.
ADOLPH RONNING.